(12) United States Patent
Wilhelm

(10) Patent No.: US 8,990,985 B1
(45) Date of Patent: Mar. 31, 2015

(54) COMPOSITE SEAT CUSHION

(75) Inventor: Terry Wilhelm, Gilbert, AZ (US)

(73) Assignee: Armorworks Enterprises LLC, Chandler, AZ (US)

( * ) Notice: Subject to any disclaimer, the term of this patent is extended or adjusted under 35 U.S.C. 154(b) by 37 days.

(21) Appl. No.: 13/407,908

(22) Filed: Feb. 29, 2012

Related U.S. Application Data

(60) Provisional application No. 61/454,265, filed on Mar. 18, 2011.

(51) Int. Cl.
*B29C 45/00* (2006.01)
*B29C 45/14* (2006.01)
*B60N 2/24* (2006.01)
*A47C 7/02* (2006.01)
*B29C 65/00* (2006.01)

(52) U.S. Cl.
CPC ............ *B29C 45/00* (2013.01); *B29C 45/14336* (2013.01); *B29C 45/14344* (2013.01); *B60N 2/24* (2013.01); *A47C 7/021* (2013.01); *B29C 65/00* (2013.01)
USPC .................................................. 5/653

(58) Field of Classification Search
CPC .. B29C 45/00; B29C 45/14; B29C 45/14336; B29C 45/14344; B29C 65/00; A47C 7/021; B60N 2/24

USPC ............ 5/653, 652.1, 654, 655.3, 655.9, 909; 428/141, 172, 158; 297/452.1
See application file for complete search history.

(56) References Cited

U.S. PATENT DOCUMENTS

| | | | |
|---|---|---|---|
| 5,189,747 | A | 3/1993 | Mundy |
| 6,585,190 | B2 | 7/2003 | Mort |
| 6,990,701 | B1 * | 1/2006 | Litvak ............................... 5/723 |
| 7,238,730 | B2 | 7/2007 | Apichatachutapan |
| 7,354,106 | B2 | 4/2008 | Dennis |
| 7,996,940 | B1 * | 8/2011 | Dahm et al. ...................... 5/654 |
| 8,668,977 | B2 * | 3/2014 | Callsen et al. ................ 428/172 |
| 2003/0006633 | A1 * | 1/2003 | Clothier ................... 297/180.12 |
| 2003/0041379 | A1 * | 3/2003 | Habboub et al. .................. 5/654 |
| 2004/0098806 | A1 * | 5/2004 | Stender et al. .................... 5/654 |
| 2008/0016622 | A1 * | 1/2008 | Prust ................................. 5/653 |
| 2008/0095983 | A1 * | 4/2008 | Callsen et al. ................ 428/141 |
| 2010/0229308 | A1 | 9/2010 | Pearce |
| 2013/0007962 | A1 * | 1/2013 | Kemper ............................ 5/653 |

\* cited by examiner

*Primary Examiner* — Peter M Cuomo
*Assistant Examiner* — Brittany Wilson
(74) *Attorney, Agent, or Firm* — James L Farmer

(57) ABSTRACT

Designs and methods are provided for a composite seat cushion comprising a molded portion made of a resilient foam material, having a sculpted top surface, and a bottom surface with a cavity therein. The composite seat cushion may further comprise an insert made of a viscoelastic foam material filling the cavity in the bottom of the molded portion.

3 Claims, 6 Drawing Sheets

COMPOSITE SEAT CUSHION

This application claims the benefit of U.S. Provisional Application No. 61/454,265, filed Mar. 18, 2011, the entire contents of which are hereby incorporated by reference.

TECHNICAL FIELD AND BACKGROUND

The present invention generally relates to shock absorbing seats, and in particular vehicle seats with seat cushions that incorporate energy absorbing materials such as viscoelastic foams to minimize occupant injury during high acceleration events.

Seats designed to attenuate high impact loads are well known in various military and civilian vehicle and aircraft applications. Military vehicles in particular may in normal course be exposed to extreme impacts from mine blasts or improvised explosive devices. Variable displacement, or energy attenuating seats are commonly employed to absorb and attenuate lethal energy pulse levels that may occur in an otherwise survivable blast or crash event. One such energy attenuating system is disclosed in patent application Ser. No. 12/384,061 assigned to the assignee of the present invention. The disclosed troop seat utilizes a sacrificial metal link that attenuates an energy pulse by collapsing in a controlled fashion as the seat strokes downward relative to a vehicle compartment, substantially reducing the peak acceleration felt by the occupant. However, testing and experience have shown that injury can occur not only during the initial impact, but also during rebound as compressive energy stored in the seat structure or seat cushion is released.

Common polyurethane foam used for vehicle seat cushions has been shown to contribute to post slam-down rebound accelerations that exceed accepted injury threshold levels as expressed in DRI (Dynamic Response Index). DRI is a dimensionless number related to spinal compression. For example, NATO document AEP-55, Volume 2 (Edition 1) entitled "Procedures for Evaluating the Protection Level of Logistic and Light Armored Vehicles—Mine Threat" specifies a DRI limit of 17.7 for seated vehicle occupants. Thus while the use of an EA seat can substantially reduce the probability of injury from the initial impact, injury may nevertheless occur during the subsequent rebound.

To counteract the rebound effect, many modern vehicle seat cushions utilize viscoelastic foams, also known as memory foams. As contrasted with polyurethane foams which rebound almost immediately after being compressed, viscoelastic foams generally rebound very slowly, and are thus more effective at mitigating seat cushion induced rebound acceleration. However seat cushions made of viscoelastic foams can be uncomfortable for prolonged use. Under the weight of a sitting occupant, viscoelastic foams tend to compress to the point of becoming substantially inelastic, and can feel quite hard. Also, because of the viscous nature of the foam and its tendency to conform, seat cushions made of viscoelastic foams are generally unable to retain their initial shape. Consequently any beneficial pressure distribution attributed to a particular sculpted shape is largely lost once the cushion fully compresses and conforms under the weight of an occupant.

SUMMARY

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a composite seat cushion comprising a molded portion made of a resilient foam material, having a sculpted top surface, and a bottom surface with a cavity therein. The composite seat cushion further comprises an insert made of a viscoelastic foam material filling the cavity in the bottom of the molded portion.

According to another exemplary embodiment, the present disclosure comprises a process for fabricating a composite foam seat cushion made of a resilient molded portion and a viscoelastic foam insert. In one exemplary embodiment the process comprises positioning the viscoelastic foam insert on a flat surface, placing a female mold of the seat cushion over the viscoelastic foam insert, and sealing the mold against the flat surface outside the perimeter edge of the viscoelastic foam insert, thereby defining a cavity bounded by the mold, the flat surface, and the viscoelastic foam insert. The molding process further comprises the step of injecting a liquefied resilient foam into the cavity.

Furthermore, other desirable features and characteristics of the present invention will become apparent from the subsequent detailed description and the appended claims, taken in conjunction with the accompanying drawings and the foregoing technical field and background.

DESCRIPTION OF THE EMBODIMENTS

Figure 1:
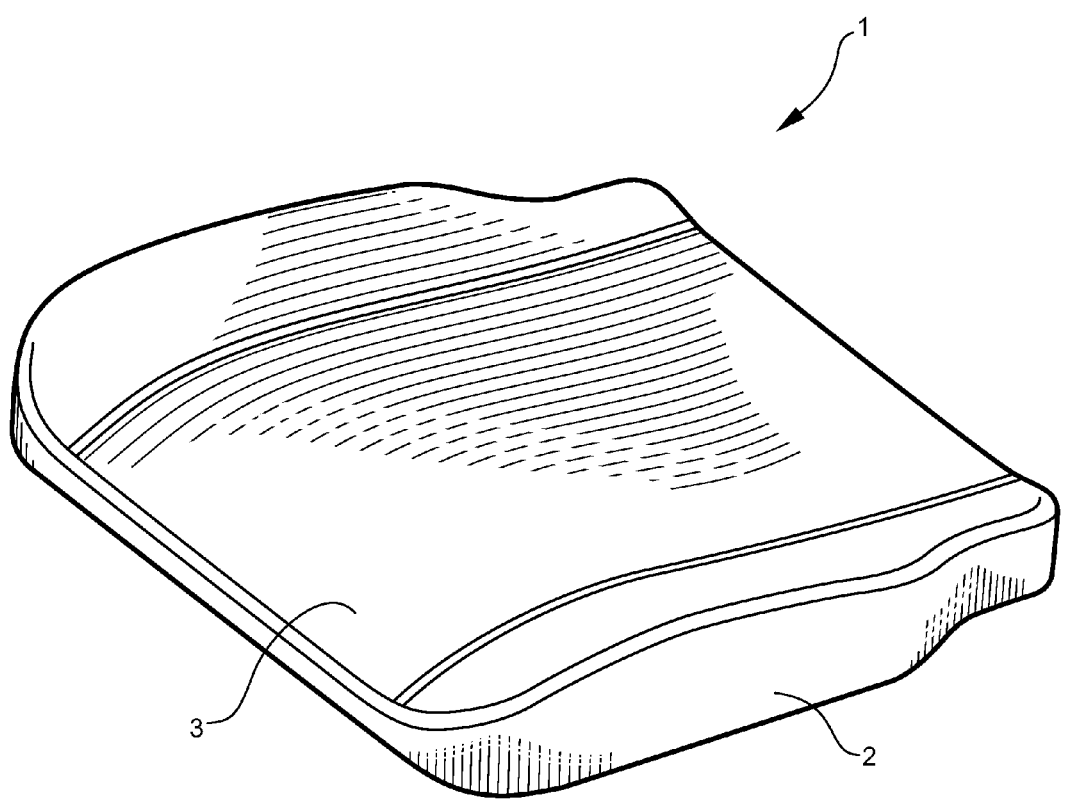
FIG. 1 is a perspective top view of a composite energy attenuating seat cushion in accordance with the present invention.
Figure 2:
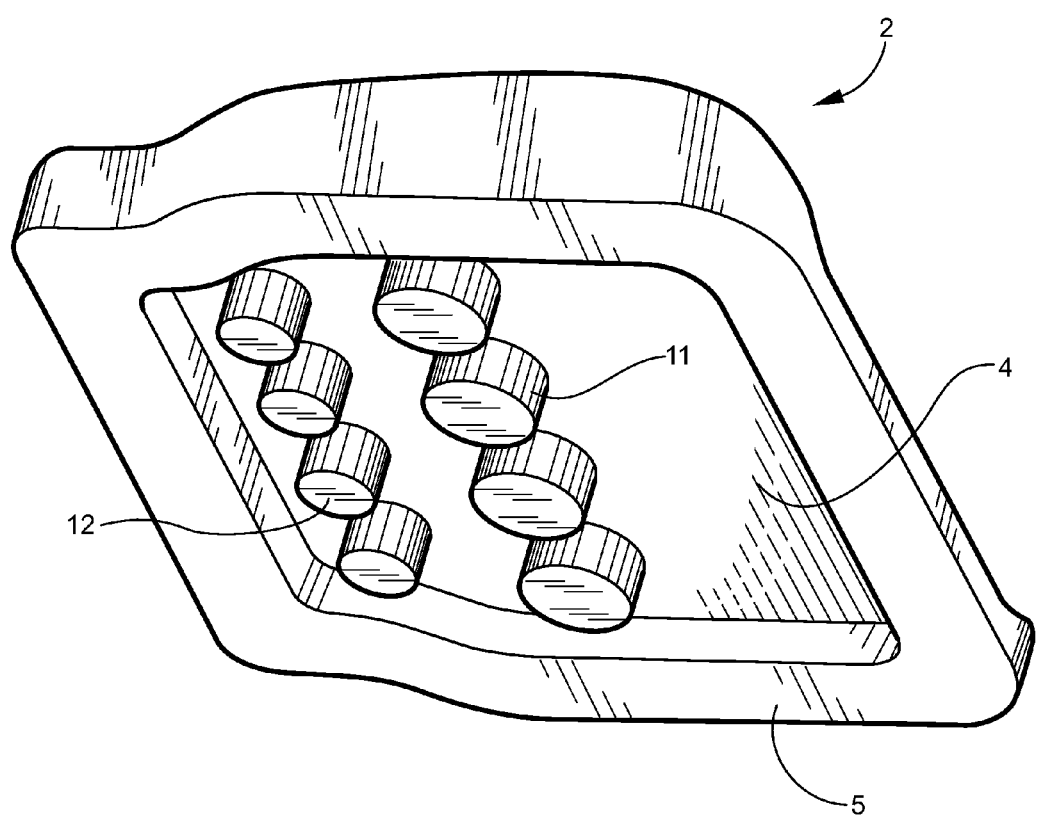
FIG. 2 is a perspective bottom view of the molded portion of the exemplary composite seat cushion in FIG. 1.
Figure 3:
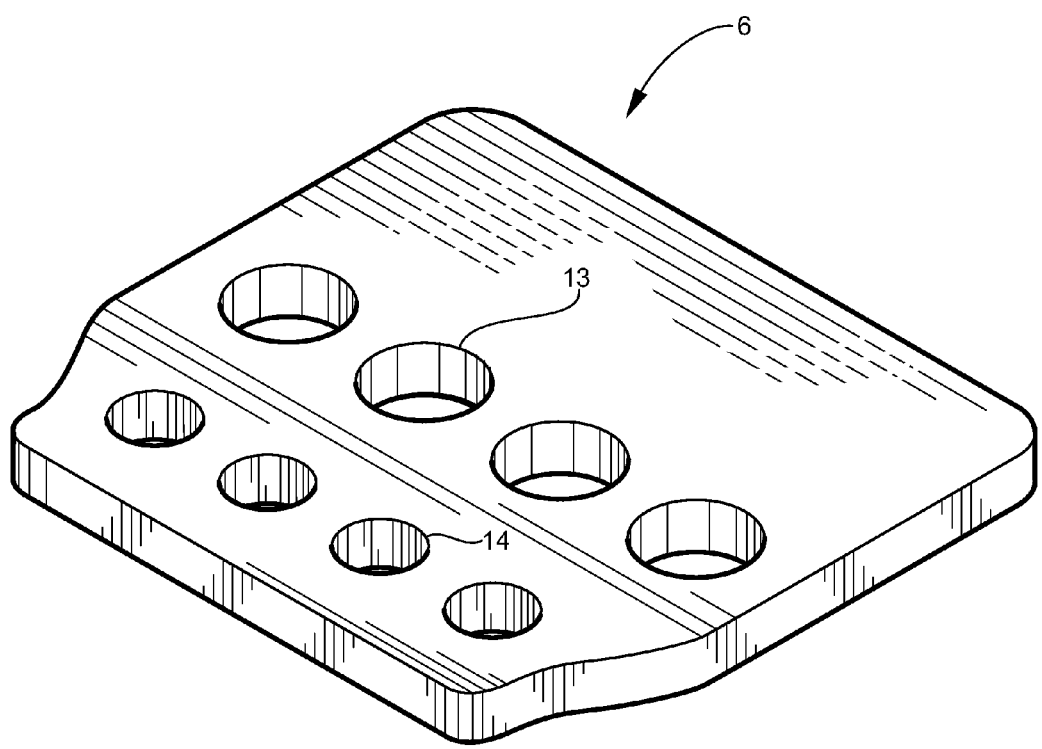
FIG. 3 is a perspective view of a viscoelastic foam insert of the present invention.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

A composite seat cushion in accordance with the present invention is depicted in FIGS. 1-5. As used herein viscoelasticity refers to the property of having a high viscosity fluid characteristic under low stress conditions and exhibiting a substantial increase in apparent viscosity under applied stress, so that the material behaves more like a solid under such high applied stress conditions. In the context of the present invention, a viscoelastic material may comprise one which behaves as a solid elastomer under high rate impact forces, and as a highly conformable viscous liquid at rest or when subject to a low rate of applied force. In terms of foam materials, viscoelastic may encompass all foam products commonly referred to as "memory foam".

The composite seat cushion 1 comprises a molded portion 2 with a sculpted top surface 3, and a cavity 4 in the bottom surface 5 for receiving a viscoelastic foam insert 6. Molded portion 2 may be made from any type of resilient foam plastic or foam rubber product suitable for use in a seat cushion. In one exemplary embodiment the molded portion 2 is made of a polyurethane foam with minimum density of 50 kg/m3, and IFD (indentation force deflection) of 150 N (Newton) +/−22 N. It should be noted that the term "molded" in reference to "molded portion 2" is used for convenience, and intended to mean a contoured shape that may have been formed by a molding process, or by any other shaping or sculpting process. The viscoelastic foam insert 6 may be made from a sheet of medium density memory foam. In one exemplary embodiment the insert 6 is a 5.8 pound per cubic foot urethane viscoelastic foam product sold by KCH Enterprises, Inc. under the trade name "Confor Foam" with designation "CF-45". Insert 6 could also be custom molded rather than formed from sheet material.

Figure 4:
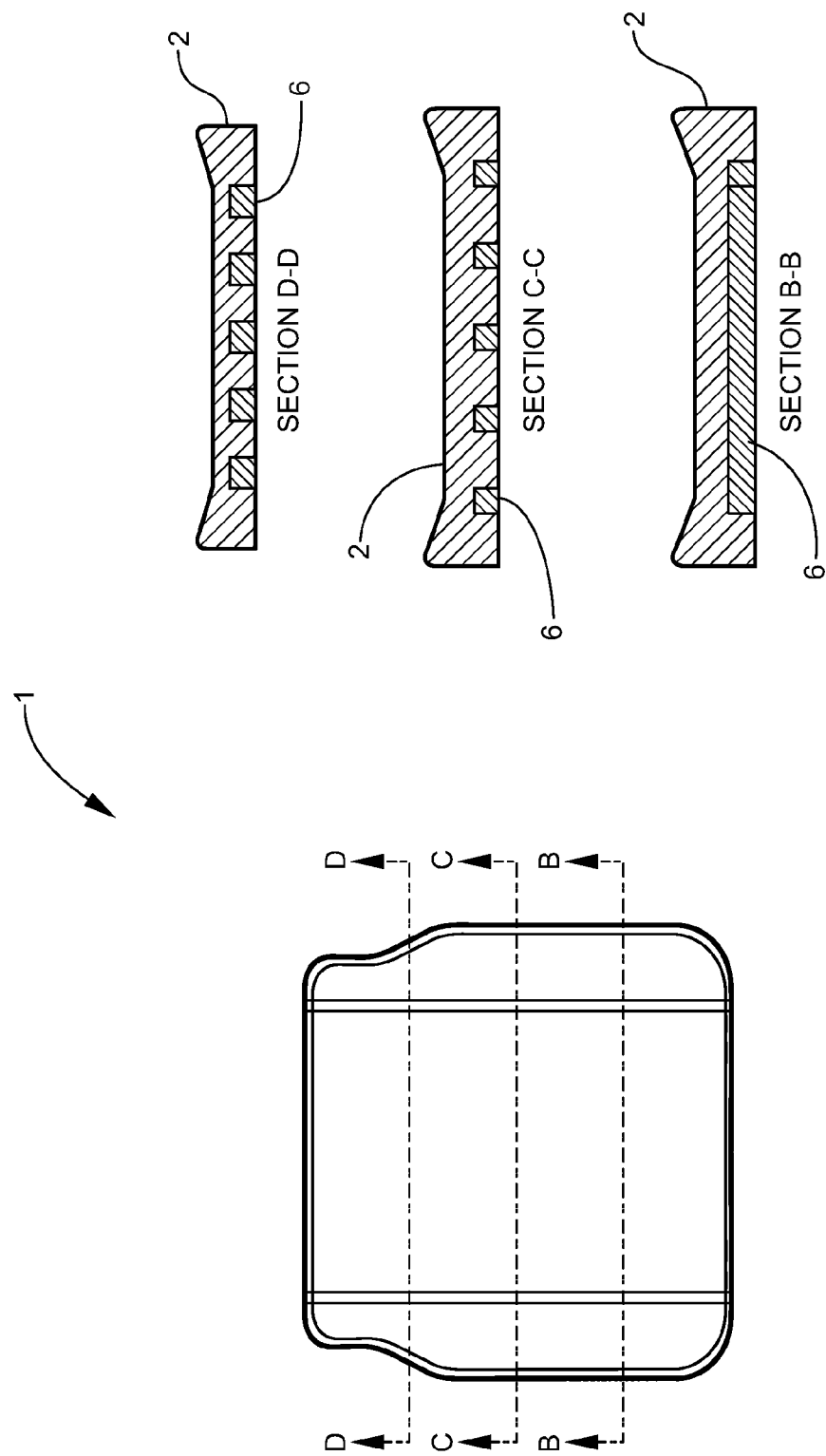
FIG. 4 is a top view and three lateral cross-section views of an exemplary composite seat cushion of the present invention.
Figure 5:
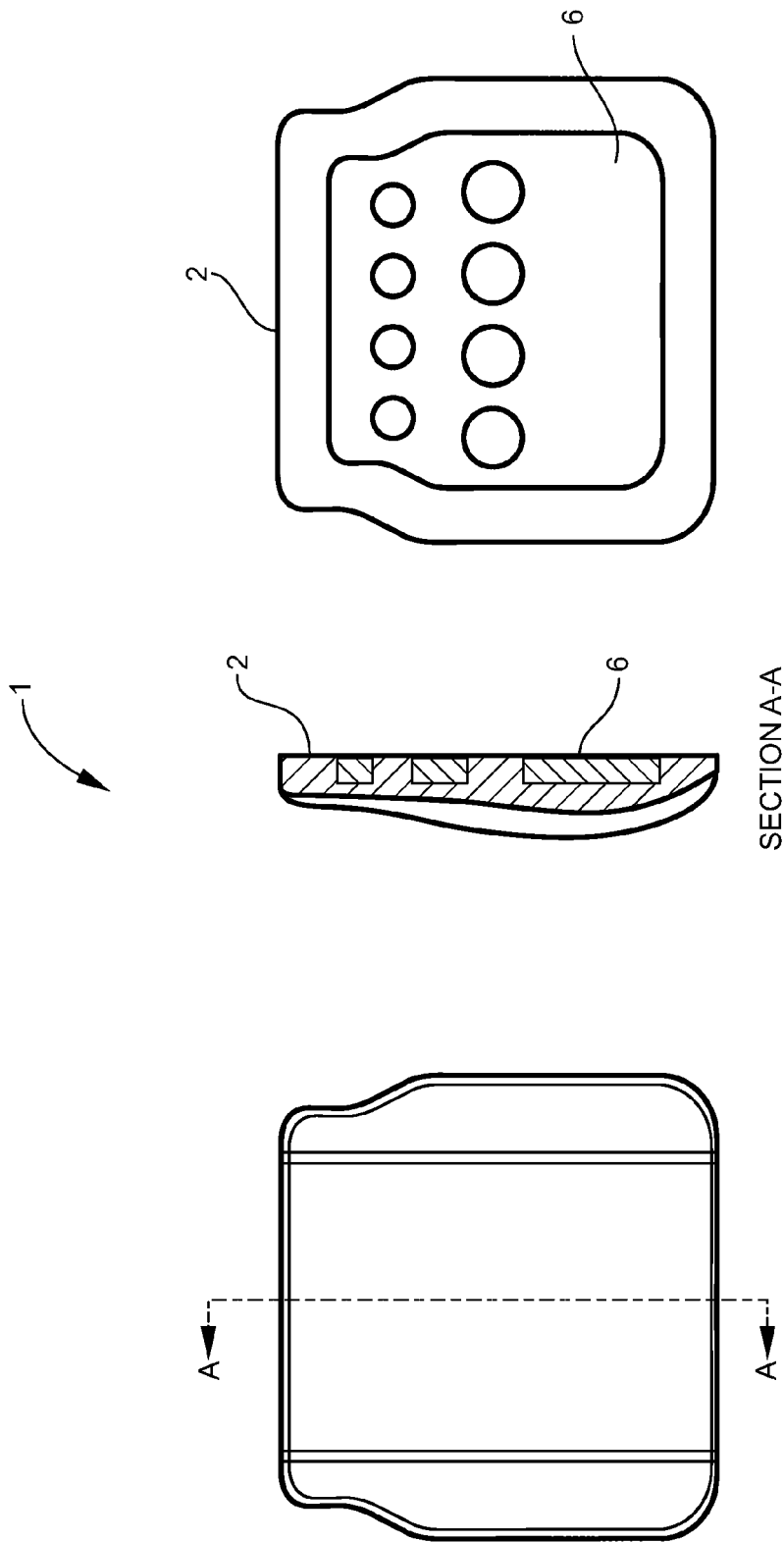
FIG. 5 is a top view, a longitudinal cross-section view, and a bottom view of the exemplary seat cushion shown in FIG. 4.

Referring particularly to FIG. 4, the thickness of the viscoelastic foam insert 6 is equal to the depth of cavity 4, and substantially less than the total thickness of the molded portion 2. In one embodiment the thickness of insert 6 is between about ⅓ and ⅔ the total thickness of the seat cushion 1 in the vicinity of the insert 6. In another particular exemplary embodiment the insert 6 is about 1.0 inches thick, while the total depth of the cushion including the insert ranges from about 1.5 to 3 inches. FIG. 4 is intended to depict a slightly more specific embodiment in which the amount of molded portion 2 overlying the insert 6 ranges from about 0.5 to 1.5 inches in thickness.

The molded portion 2 preferably further comprises a series of integral pillars 11, 12 extending the full depth of cavity 4, and received by corresponding passages, or holes 13, 14 in the insert 6. Although depicted as circular, the pillars 11, 12, and holes 13, 14 may be of any cross-sectional shape, such as square, rectangular, triangular, hexagonal, and the like. The pillars are disposed about at least the middle to back portion of the cavity 4 to correspond with the region of the seat cushion that sees the greatest pressure load during use. However the shape, dimensions, quantity, and distribution of pillars 11, 12 and corresponding holes 13, 14 may be varied as needed to produce any preferred combination of elastic and viscoelastic behavior of the seat cushion 1. For example, the pillars could comprise rows of five or three pillars instead of four as depicted. Or the pillars could comprise one relatively large elongated pillar near the center of the cushion, and one smaller elongated pillar near the back of the cushion. Alternatively the pillars could comprise rows aligned in a front to back direction on the cushion instead of side to side, with pillars of multiple different widths within each row. Moreover the total pillar area, and the ratio of pillar area to insert foam area may be preferentially varied to make the composite cushion generally more elastic or more viscoelastic as dictated by a particular application.

In the embodiment shown in the drawings the pillars are arrayed in two parallel rows comprising a first row of evenly spaced large pillars 11, and a second row of evenly spaced small pillars 12. The exemplary rows run width-wise across the seat cushion, with the first row of large pillars 11 near the middle of the cavity 4, and the second row of small pillars closer to the back of the cavity. The dimensions of the large pillars 11 are between about 1.5 and 2 times that of the small pillars 12. For example, in one embodiment the width of the large pillars is about 2 inches, and the width of the small pillars is about 1.5 inches.

Figure 6:
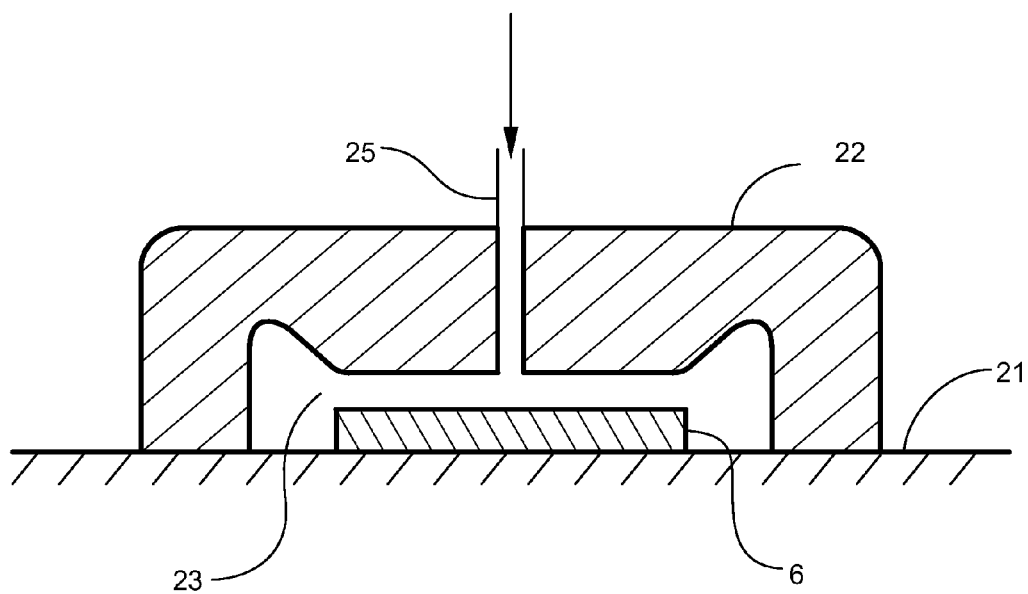
FIG. 6 is a cross-section of a mold assembly for fabricating a composite seat cushion of the present invention using an insert molding process.

Referring to FIG. 6, the composite seat cushion 1 may be fabricated by an insert molding process. In one embodiment a viscoelastic foam insert 6 is cut to shape, including the holes 13, 14, and placed on a flat surface 21 as shown. The flat surface 21 may comprise one half of a two part mold, or simply a suitable table top or plate adapted to serve as the bottom or base of a mold. A female mold 22 of the seat cushion shape is positioned over the insert 6, and sealed against flat surface 21, creating a cavity 23. The composite cushion 1 is then formed by simply injecting or pouring liquefied foam through filler pipe 25, filling cavity 23 and the holes 13, 14 in insert 6. As the foam sets, it expands and fills the entire cavity 23, creating the molded portion 2 along with integral pillars 11, 12 within holes 13, 14.

The above insert molding process description is intended to be fundamental in nature, and by no means exclusive or comprehensive. For example it may be desirable to fill the holes 13, 14 with liquid foam before attaching the mold 22 in order to minimize formation of air pockets in pillars 11, 12. Further, the liquefied foam may preferably be injected at multiple locations simultaneously, instead of through a single filler pipe as depicted for a more even fill. In addition, an optimized process may preferably incorporate venting means for allowing air and gas to escape from the mold as the liquid foam expands and tries to fill the mold cavity. Those skilled in the art will appreciate that numerous other alternative or additional steps may be employed to obtain a fully optimized molding process.

Moreover, the composite seat cushion 1 of the present invention may be formed by processes other than an insert molding process. For example, in one alternative process, the cushion 2 could be formed in a molding process completely separate from the insert 6, and the two components subsequently bonded together to form an integral composite seat cushion 1.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An insert molding process for fabricating an energy attenuating composite foam seat cushion made of an elastic foam molded portion and a viscoelastic energy attenuating foam insert portion, comprising:
   positioning the viscoelastic energy attenuating foam insert portion on a flat surface, the insert having an array of vertical passages extending there-through;
   placing a female mold of the seat cushion over the viscoelastic energy attenuating foam insert portion, and sealing the mold against the flat surface outside a perimeter edge of the foam insert portion, thereby defining a cavity bounded by the mold, the flat surface, and the viscoelastic energy attenuating foam insert portion; and
   injecting a liquefied elastic foam into the cavity, thereby filling the cavity and the vertical passages in the insert with the elastic foam.

2. The insert molding process of claim 1, wherein the vertical passages are cylindrical.

3. The insert molding process of claim 2, further comprising filling the passages with elastic foam prior to sealing the mold to the flat surface.

\* \* \* \* \*